United States Patent Office 2,955,882
Patented Oct. 11, 1960

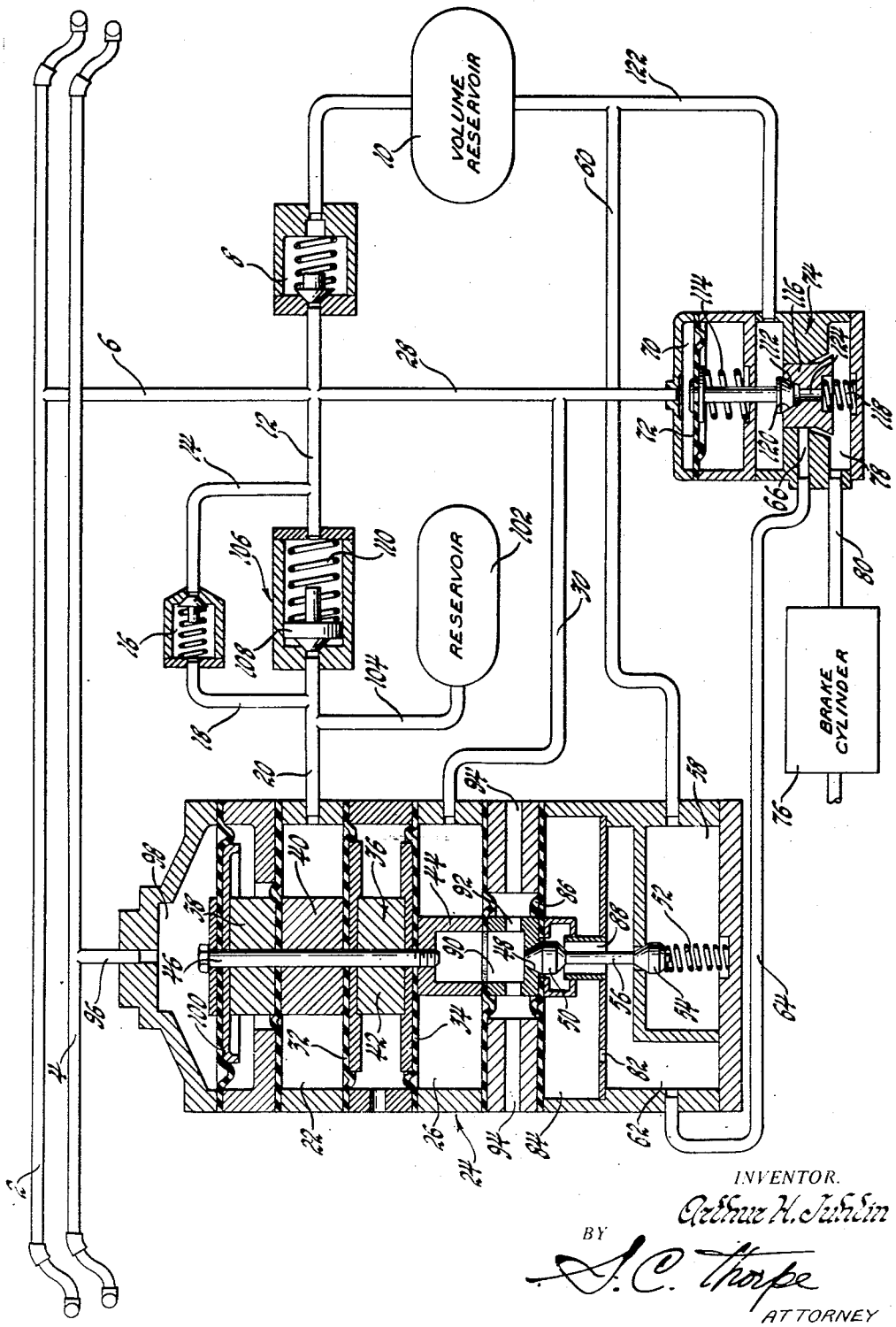

2,955,882

RAILWAY VEHICLE BRAKE SYSTEM AND VALVING THEREFOR

Arthur H. Juhlin, La Grange Park, Ill., assignor to General Motors Corporation, Detroit, Mich., a corporation of Delaware Filed Feb. 5, 1958, Ser. No. 713,408

2 Claims. (Cl. 303—29)

This invention relates generally to braking systems for railway vehicles and valving for use in such systems and particularly to systems of the pneumatic type wherein the brakes on the individual vehicles making up a railroad train are controlled by varying the pressures carried in one or more pipes extending the length of the train.

The advent of the new light-weight type trains has resulted in simplified brake systems wherein the brakes of the individual cars of the train are controlled by adding pressures in varying degrees to a so-called straight air pipe which is normally exhausted during release of the brakes. Most of the present day locomotives, however, adhere in principle to the more conventional system of using a brake pipe running the length of the train which is normally fully charged to a predetermined pressure to effect release of the brakes on the individual cars and reducing the pressure of the charged brake pipe to apply the brakes on the individual cars. Since these two methods of control without more are incompatible, serious difficulties are encountered when it is desired to couple a conventional type locomotive to one or more of the new light-weight type cars utilizing the straight air pipe type of control. It is, therefore, an object of the present invention to provide in such cars additional means including novel valve and valve actuating means which will enable the brakes of the individual car to be applied either by a reduction in brake pipe pressure or else by charging the straight air pipe.

For a further understanding of the invention and the objects thereof reference may be made to the accompanying detailed description and drawing which represents a schematic diagram of the novel brake system.

Before beginning the description, it is emphasized here that the term "brake pipe" is a well known term in railroad brake art and is so used here, i.e., "brake pipe" means the pipe which runs from the locomotive through the various cars making up the train which is normally charged to charge the brake components on the individual cars of the train and in which a reduction in pressure may be effected by a brake valve in the locomotive which reduction in pressure causes application of the brakes in the individual cars. The term "straight air pipe" is also a term well known in locomotive and train braking practice and is so used herein, i.e., it is defined as a pipe extending from the locomotive through the train which is normally exhausted but which may be charged to effect application of the brakes on the individual cars.

Referring then to the drawing, a brake pipe which is identified by a numeral 2 is shown as a part of the brake system on an individual car. Also shown is a straight air pipe 4. As previously emphasized in conventional trains the brake pipe 2 during release of the train brakes is normally charged to a predetermined pressure in a conventional manner through the engineer's brake valve on a conventional type locomotive, and the pressure therein is reduced by the engineer's brake valve to apply the train brakes. On the other hand, when using a light-weight type of locomotive with light-weight cars, it is customary to maintain the brake pipe fully charged at all times and control application of the brakes by means of the straight air pipe 4 which is maintained normally exhausted by the brake valve on the light-weight locomotive to effect release of the brakes. It will thus be appreciated that since both a brake pipe and a straight air pipe are provided on light-weight train cars the resulting brake system is composite in type inasmuch as either a conventional or light-weight type of locomotive may be coupled thereto either solely to the brake pipe in the case of the conventional locomotive or else in the case of the light-weight locomotive to both the brake pipe and the straight air pipe. The brake pipe 2 has connected thereto by the piping 6 and one-way check valve 8 a volume reservoir 10 which is normally charged thereby. Also connected to the brake pipe 2 via the piping 6, 12, 14, one-way check valve 16 and piping 18 and 20 is a chamber 22 of a unique relay valve assembly indicated generally by a numeral 24. The relay valve assembly 24, which forms an important part of applicant's invention, also includes a chamber 26 which is directly charged by the brake pipe 2 via the piping 6, 28, and 30. It will be observed that the pressure in chamber 22 acts against a diaphragm 32 and the pressure in chamber 26 acts against a diaphragm 34. The effective areas of diaphragms 32 and 34, however, are equal so that the pressures in chambers 22 and 26 when these chambers are normally fully charged from the brake pipe 2 tend to balance each other so that there is no resultant effect or movement of the movable assembly indicated by a numeral 36 and comprising the plates 38, 40, 42 and member 44 all secured together in stacked relationship by a stud 46. The member 44 at its lower end is provided with a valve seat 48 against which an exhaust valve 50 is normally held seated by means of a spring 52 acting against a supply valve 54 connected to the exhaust valve 50 by stem 56. The valve assembly 24 at its lower end when viewing the drawing includes a chamber 58 to which air is supplied under pressure from the volume reservoir 10 via the piping 60. The chamber 58 may be connected to an outlet chamber 62 by downward unseating movement of valve 54 against spring 52. Outlet chamber 62 is connected via piping 64 through a valve port 66 which is normally maintained open as long as there is sufficient pressure supplied by the brake pipe 2 through piping 6 and 28 to chamber 70 to act against the diaphragm 72 of a relay valve assembly 74 whose operation and purpose will appear later in the specification.

A typical railway vehicle brake cylinder 76 is carried to the piping 64 via the port 66, a chamber 78 and piping 80. The brake cylinder 76 is conventional and includes the usual piston cylinder assembly wherein air under pressure is supplied to the face of the piston to thereby apply the brakes of the vehicle.

Assuming a railway vehicle including the equipment so far shown and described to be connected to a locomotive wherein the brakes are solely controlled by varying the pressure in the brake pipe 2 the system will function as follows: With the volume reservoir 10 and the chambers 22 and 26 charged to brake pipe pressure a reduction in the brake pipe pressure will cause a consequent reduction in pressure in the chamber 26 of the relay valve assembly 24. Because of the presence of the check valve 16, however, the pressure in the chamber 22 will be maintained. This will cause the movable assembly 36 to move downwardly carrying with it the valve 50 and the valve 54 causing valve 54 to open. Opening of valve 54 will connect the pressure in the volume reservoir 10 via the piping 60, chamber 58, chamber 62, piping 64, port 66, and piping 80 to the brake cylinder 76 causing the cylinder to apply brakes of the vehicle. The amount of reduction of pressure in the brake pipe 2, of course, will be reflected by the reduction in pressure in the chamber 26 of the relay valve assembly 24. It will be noted, however, that as pressure is supplied to the brake cylinder 76 from the volume reservoir 10 air under pressure is also supplied from the chamber 62 through the port 82 to a chamber 84 and a diaphragm 86. As the pressure builds up in the chamber 84, it will cause the assembly 36 to move upwardly until the supply valve 54 is again closed, thus maintaining the magnitude of the brake application constant for a given reduction in the pressure of the brake pipe 2. To release the brakes on the railway vehicle the pressure in the brake pipe 2 will be reinstated to its normal charge in a conventional manner with the engineer's brake valve on the locomotive. This restoration of pressure in the brake pipe 2 will also restore the pressure in the chamber 26 so that it is the same as in the chamber 22. This, however, will cause an unbalance in the valve assembly 24 by reason of the pressure now present in the chamber 84. Consequently, the movable assembly 36 will move upwardly unseating the exhaust valve 50. Unseating exhaust valve 50 will allow the air in brake cylinder 76 to move through the piping 80, port 66, piping 64, chamber 62, passageway 88, past the exhaust valve 50 into the chamber 90 and out the exhaust ports 92 and 94. After air is exhausted from the brake cylinder 76, however, the air in chamber 84 will also be exhausted through the port 82, passageway 88, past exhaust valve 50 and out exhaust ports 92 and 94 thereby allowing the movable assembly 36 to again move downwardly until the exhaust valve is again seated.

Turning now to systems in which the brakes are operated by charging the straight air pipe 4 by the engineer's brake valve, it will be noted in the present instance the straight air pipe 4 is connected by piping 96 to an upper chamber 98 in the relay valve assembly 24. The operation of the brakes of the vehicle by the straight air pipe 4 is as follows: Assuming that a charge is put in the straight air pipe 4, this will pressurize the chamber 98 and cause such pressure to act against the diaphragm 100 thereby causing the movable assembly 36 to move downwardly. As the movable assembly 36 moves downwardly, however, it will cause unseating of the supply valve 54 to thereby connect the volume reservoir 10 to the brake cylinder 76 in the manner previously described. Again, as air is supplied to the brake cylinder 76 from the volume reservoir 10 it is also supplied via the port 82 to the chamber 84 to act against the diaphragm 86. When sufficient pressure is built up in chamber 84 to counter-act the pressure in chamber 98, the movable assembly 36 will again move upwardly until the supply valve 54 is again seated cutting off any further supply of air to the brake cylinder 76 and chamber 84. To release the brakes of the vehicle the air in the straight air pipe 4 will be exhausted by means of the engineer's brake valve. This, of course, will exhaust the pressure in the chamber 98 thereby allowing the movable assembly 36 to move upwardly unseating the exhaust valve 50. Unseating of exhaust valve 50 as previously described will allow the pressure in the brake cylinder 76 to be exhausted via the piping 80, port 66, piping 64, chamber 62, passageway 88 past exhaust valve 50 and out the exhaust ports 92 and 94. As the air is exhausted from the brake cylinder 76, however, again the air in the chamber 84 will also be exhausted therefrom out the port 82 into chamber 62 and through passageway 88 past exhaust valve 50 and out ports 92 and 94 until the pressure in chamber 84 is again sufficiently relieved to allow the movable assembly 36 to move downwardly and seat exhaust valve 50.

From the foregoing description it will be appreciated that this brake system is adaptable to a train brake system which utilizes only the usual brake pipe for controlling operation of the brakes on the individual cars of the train or alternatively the type of system in which the brake pipe is used primarily as a supply pipe and includes a control pipe such as the straight air pipe 4. Thus the brake system of such vehicles is adapted for either type of control by the addition of the special relay valve assembly 24 and its unique manner of connection into the system. (To maintain the pressure in the chamber 22 practically constant even though the volume of the chamber 22 changes slightly upon movement of assembly 36, a reservoir 102 has been provided which is in direct communication with chamber 22 via piping 104 and 20.)

The normal operating pressure in the brake pipe 2 to effect complete release of the brakes of the railway vehicles of the train to which a particular locomotive may be connected often varies with the particular type of locomotive; for example, some locomotives may operate with the brake pipe charged to 110 pounds to effect release of the train brakes, others with the brake pipe charged to only 75 pounds. Assuming the vehicle shown to be in a train in which the brake pipe is charged to 110 pounds' pressure, then the pressure in the chamber 22 will be maintained at 110 pounds per square inch, because of the presence of the one-way check valve 16. If the vehicle is subsequently connected to a locomotive which maintains the brake pipe 2 charged to a pressure of say 75 pounds, then the pressure in the chamber 26 would become only 75 pounds and a brake application would be made even though no reduction occurred in the brake pipe and no brake application was desired. This condition, of course, could be rectified by suitable petcocks which could be opened to sufficiently reduce the pressure in the chambers 22 of the relay valves of the vehicles of the train to at or below 75 pounds per square inch in the chambers 22. To avoid having to perform such a manual operation on each of the cars of the train, which operation might be missed or overlooked resulting in an undesirable brake application, a second one-way check valve assembly indicated generally by a numeral 106 has been added. The check valve assembly 106, it will be noted, is placed in parallel with the one-way check valve 16. Check valve 108 is loaded with a spring 110 of suitable size, for example, a 40-pound spring. If now the brake pipe pressure is sufficiently reduced so that pressure differential between the brake pipe 2 and the chamber 22 is greater than 40 pounds (greater than the normal operating range of the brake pipe), the pressure in the chamber 22 will unseat the check valve 108 thereby relieving the pressure in the chamber 22. Subsequent recharging of the brake pipe 2 to its normally charged pressure will then properly recharge the chamber 22. It will thus be appreciated that the relay valves 24, because of the presence of the calibrated spring valve assembly 106, can be re-adjusted throughout the length of the train by momentarily effecting a brake application with the engineer's brake valve sufficient to completely discharge the brake pipe 2 and subsequently moving the brake valve to release position to recharge the brake pipe and chambers 22 and 26 to the same pressure. This latter feature constitutes an important part of the applicant's invention.

There are occasions when the pressure in the brake pipe 2 during train operation is reduced an amount substantially greater than its normal operating range, for example, during an emergency application of the brakes or when a break-in-two occurs venting the brake pipe 2 to atmosphere. In such an instance the brake pipe pressure in the chambers 70 of the valve assembly 74 will be relieved allowing the diaphragm 72 and the valve 112 connected thereto to move upwardly under the influence of spring 114. As this valve moves upwardly, however, it allows valve 116 to also move upwardly under the influence of spring 118 thereby closing off the port 66 and disconnecting piping 64 from chamber 78 and piping 80. As the valve 112 moves further upwardly, however, it becomes unseated on its seat 120 so as to allow air to be supplied directly to the brake cylinder from the volume reservoir 10 via piping 122 past valve 112 via passageway 124 in valve 116 into chamber 78 and via piping 80 to brake cylinder 76. It should be appreciated that the reason the valve 74 is necessary is that under emergency conditions where an emergency application of the brakes is made by the engineer by a complete reduction of air in the brake pipe 2, or by break-in-two, it is essential that the maximum braking effort be exerted as quickly as possible. Because of the presence of the check valve assembly 106, however, this would not occur without the valve assembly 74 since a complete reduction in the brake pipe 2 would, of course, also substantially relieve the pressure in the chamber 22 because of the check valve 108.

From the foregoing description it may now be appreciated that a new composite type of brake system has been provided for individual railway vehicles which may be connected into a train utilizing the brake pipe as a means for controlling the brakes on the vehicles or which utilizes a brake pipe as supply means and a straight air pipe as control means for the brakes on the individual vehicles. The systems are readily calibrated and recalibrated for operation with locomotives using different operating pressures in the brake pipe to effect release of the brakes. The systems are particularly sensitive to emergency brake applications either by the engineer with the engineer's brake valve or when inadvertently caused by break-in-twos, etc. Furthermore, the system set forth is made feasible by the unique valve assembly 24 which as previously emphasized is considered to be an important and patentable feature of the applicant's invention.

I claim:

1. In a railway vehcile brake system including a brake cylinder chargeable to effect application of brakes of said system and a brake pipe normally chargeable to a predetermined pressure to effect release of the brakes of said system and a straight air pipe normally exhausted to effect release of the brakes of said system, means operable to apply the brakes of said system upon a reduction in pressure in said brake pipe or alternatively upon charging of said straight air pipe comprising a valve means including a normally closed valve connected between said brake pipe and said brake cylinder, said valve means having connected to the valve thereof a movable wall of an expansible chamber connected to said straight air pipe, which chamber when charged by air from said straight air pipe moves said wall to unseat said valve and connect said brake pipe to said brake cylinder, said valve means including second and third expansible chambers each having a movable wall, the walls of said second and third chambers being substantially equal in area, said second chamber being connected to said brake pipe through a one-way check valve, said third chamber being in free communication with said brake pipe, said walls being connected to said valve so that upon a reduction of pressure in said brake pipe and consequently in said third chamber said valve is unseated to connect said brake pipe to said brake cylinder.

2. In a railway vehicle brake system including a brake cylinder chargeable to effect application of brakes of said system and a brake pipe normally chargeable to a predetermined pressure to effect release of the brakes of said system and a straight air pipe normally exhausted to effect release of the brakes of said system, means operable to apply the brakes of said system upon a reduction in pressure in said brake pipe or alternatively upon charging of said straight air pipe comprising a valve means including a normally closed valve connected between said brake pipe and said brake cylinder, said valve means having connected to the valve thereof a movable wall of an expansible chamber connected to said straight air pipe, which chamber when charged by air from said straight air pipe moves said wall to unseat said valve and connect said brake pipe to said brake cylinder, said valve means including second and third expansible chambers each having a movable wall, the walls of said second and third chambers being substantially equal in area, said second chamber being connected to said brake pipe through a one-way check valve, said third chamber being in free communication with said brake pipe, said walls being connected to said valve so that upon a reduction of pressure in said brake pipe and consequently in said third chamber said valve is unseated to connect said brake pipe to said brake cylinder, a second one-way check valve between said second chamber and said brake pipe connected in parallel with said first-mentioned check valve between said second chamber and said brake pipe calibrated to unseat upon a predetermined substantial drop in pressure in said brake pipe to at least partially discharge said second chamber so as to recalibrate said valve means when said system is connected to brake pipes having different brake pipe release pressures.

References Cited in the file of this patent
UNITED STATES PATENTS

| | | |
|---|---|---|
| 1,440,422 | Thomas | Jan. 2, 1923 |
| 2,289,559 | Turek | July 14, 1942 |
| 2,871,063 | Swander | Jan. 27, 1959 |